(No Model.)

W. MURCHEY.
TAP.

No. 343,056. Patented June 1, 1886.

Witnesses.
James E. Mayhee
Chas H Riches

Inventor.
Wm Murchey
by
Donald C. Ridout &co
Attys

N. PETERS, Photo-Lithographer, Washington, D. C.

UNITED STATES PATENT OFFICE.

WILLIAM MURCHEY, OF TORONTO, ONTARIO, CANADA.

TAP.

SPECIFICATION forming part of Letters Patent No. 343,056, dated June 1, 1886.

Application filed November 23, 1885. Serial No. 183,664. (No model.) Patented in Canada November 26, 1885, No. 22,883.

*To all whom it may concern:*

Be it known that I, WILLIAM MURCHEY, a subject of the Queen of Great Britain, residing at the city of Toronto, in the county of York, in the Province of Ontario, Canada, have invented an Improved Tap, of which the following is a specification.

The object of the invention is a tap which can be readily set to cut any given number of threads, and having done so will automatically be thrown out of action, so that the tap may be withdrawn straight out of the hole without the necessity of unscrewing it; and it consists, essentially, of screw-cutters fitted into and pivoted in slots made in a mandrel having a hole in its center, to receive a spindle arranged to expand the cutters, and adjustably connected to a cutter extending outside of the mandrel, and having an adjustable gage, which can be readily set to come in contact with the surface of the article being screwed, to gage the depth at which the screw-cutting shall cease, and by pushing the internal spindle clear of the pivoted cutters permit their springs to throw them out of action, substantially as hereinafter more particularly explained.

Figure 1:
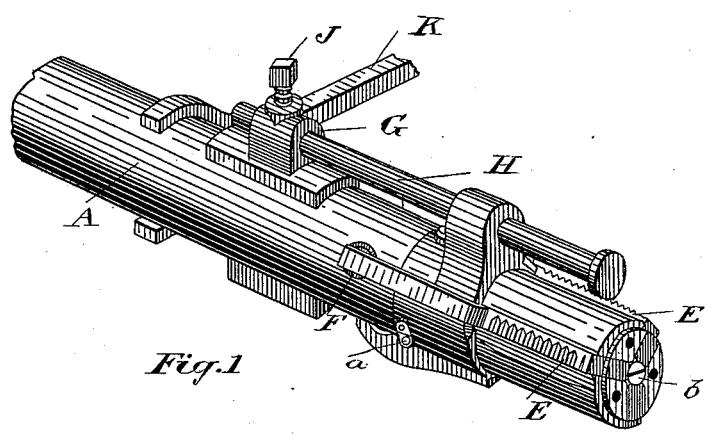
Figure 2:
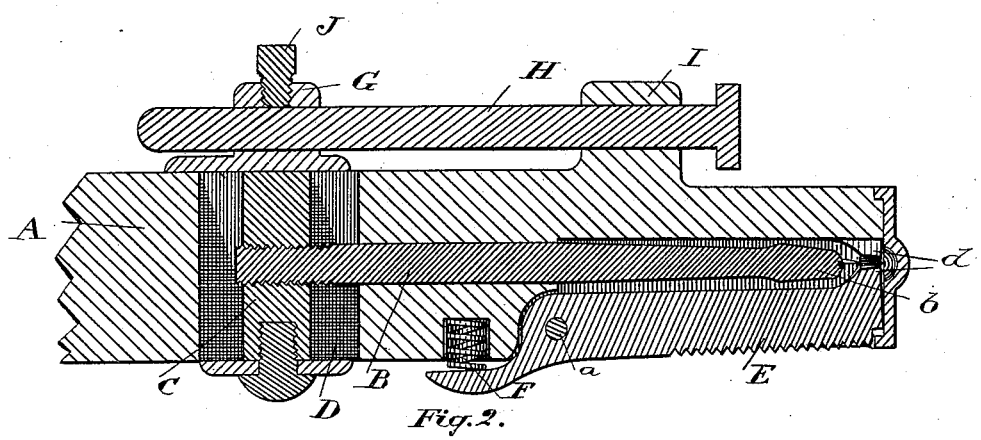

Figure 1 is an outside perspective view of my improved tap. Fig. 2 is a longitudinal section of the same.

A represents a mandrel, made any required size and designed to fit into a machine, or it may be made to be operated by an ordinary hand-wrench.

B is a spindle inserted into a hole made in the center of the mandrel A. One end of the spindle has a thread cut on it to screw into the cotter C, which passes through the slot D, made in the mandrel A, immediately behind the hole into which the spindle B is placed.

E represents the screw-cutters, which are fitted into slots made in the mandrel A, and are each pivoted at *a* to the said mandrel.

F represents a spring, which is placed below each cutter E, behind its pivots *a*, the expansion of the springs causing the ends of the cutters E to fall in toward the center of the mandrel, so that when the springs F are permitted to act the cutters will be carried clear of the thread being cut, thereby enabling the ready withdrawal of the tap without the necessity of unscrewing it.

G is a head formed on top of the cotter C, and fitting the outside of the mandrel A. This head G has a hole through it, to permit the passage of the gage-rod H, which also passes through a hole in the guide I, formed upon or attached to the mandrel A, as indicated. A set-screw, J, screwed into the head G, provides means for holding the gage-rod H in any desired position.

A tapered head, *b*, is formed on the end of the spindle B, and inward projections *d* are formed on the end of each cutter E. When the head *b* is inserted between the ends of the cutters E, as indicated in Fig. 1, the said cutters are held out, as indicated in that figure, and when so held will cut the thread they are intended for.

In operating my improved tap, I first adjust the gage-rod H so that its end shall come against the surface of the article being tapped about the time that I wish to stop the cutting of the thread. The said gage-rod is thus pushed back, and as it is connected to the cotter C, as before described, the said cotter is pushed back with it, and the head *b* of the spindle B is thereby withdrawn from between the inward projections *d* on the cutters E, thereby leaving the said cutters free to be acted upon by the springs F, which cause, as before described, the said cutters to spring inwardly toward the center of the spindle, thereby carrying them free to the thread just cut, and enabling the tap to be pulled out without the necessity of unscrewing it. When the mandrel A is connected to a drilling-machine or other spindle, weighted or otherwise arranged to spring back when it has reached the end of the stroke, I provide an arrangement for re-expanding the cutters E, so as to be ready to tap the next hole. This may be accomplished by attaching a fork, K, or its equivalent, which is attached to some stationary part of the machine, and against which the head G strikes when the mandrel is drawn back, as before mentioned. In this way the cotter C is pushed forward, and as the spindle B is attached to it the latter's head *b* is pushed between the cutters E, thereby causing them to expand, as mentioned.

By screwing the spindle B into the cotter C it can be readily adjusted so that the head *b* will not be pushed forward farther than is necessary to expand the cutters.

What I claim as my invention is—

1. The cutters E, pivoted, as described, in slots made in the mandrel A, and actuated by the springs F, as specified, in combination with the spindle B, inserted into the mandrel A, between the cutters E, and connected to the cotter C, substantially as and for the purpose specified.

2. The cutters E, pivoted, as described, in slots made in the mandrel A, and actuated by the springs F, as specified, a spindle, B, inserted into the mandrel A, between the cutters E, and connected to the cotter C, in combination with the gage-rod H, adjustably connected to the head G of the cotter C, substantially as and for the purpose specified.

3. The cutters E, pivoted, as described, in slots made in the mandrel A, and actuated by the springs F, as specified, in combination with the spindle B, inserted in the mandrel A, between the cutters E, and having a tapered head, $b$, to act against the inward projections $d$, formed on the cutters E, substantially as and for the purpose specified.

Toronto, November 6, 1885.

WM. MURCHEY.

In presence of—
   JAMES B. VERNEY,
   CHARLES C. BALDWIN.